United States Statutory Invention Registration [19]

[11] Reg. Number: H943

Garvey [43] Published: Aug. 6, 1991

[54] ORGANIC LINER FOR THERMOSET COMPOSITE TANK

[75] Inventor: Raymond E. Garvey, Knoxville, Tenn.

[73] Assignee: The United States of America as represented by the United States Department of Energy, Washington, D.C.

[21] Appl. No.: 449,175

[22] Filed: Dec. 13, 1989

[51] Int. Cl.[5] ..... B65D 90/04

[52] U.S. Cl. ..... 220/456; 220/453; 220/457; 220/901

[58] Field of Search ..... 220/901, 5 A, 457, 456, 220/453

[56] References Cited

U.S. PATENT DOCUMENTS

| | | | |
|---|---|---|---|
| 2,788,306 | 4/1957 | Cox et al. | 220/456 X |
| 2,927,867 | 3/1960 | Hings | 220/457 X |
| 3,257,265 | 6/1966 | Isenberg | 220/901 X |
| 3,383,004 | 8/1965 | Closner . | |
| 3,406,857 | 10/1968 | Perry | 220/901 X |
| 3,738,527 | 11/1970 | Townsend . | |
| 3,795,573 | 3/1974 | Smith et al. | 220/901 X |
| 3,814,275 | 6/1974 | Lemons | 220/453 X |
| 4,117,947 | 8/1977 | Androulakis . | |
| 4,366,917 | 8/1980 | Kotcharian . | |
| 4,378,403 | 3/1983 | Kotcharian | 220/901 X |
| 4,452,375 | 6/1984 | Marcus | 220/456 X |
| 4,785,955 | 11/1988 | Sasaki | 220/457 X |

*Primary Examiner*—Linda J. Wallace

*Attorney, Agent, or Firm*—Katherine P. Lovingood; Stephen D. Hamel; William R. Moser

[57] ABSTRACT

A cryogenic tank that is made leak-proof under cryogenic conditions by successive layers of epoxy lining the interior of the tank.

3 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ORGANIC LINER FOR THERMOSET COMPOSITE TANK

This invention was developed pursuant to a contract with the U.S. Department of Energy.

This invention relates to a coating for sealing surfaces having complex geometry, particularly to a coating of epoxy layers that forms a surface impermeable in harsh cryogenic and chemically corrosive environments.

BACKGROUND OF THE INVENTION

Previously, scientists have followed two approaches in the development of cryotanks that were impervious to deterioration caused by the contained material and environmental factors. One is a metal lined tank with the metal usually in the form of a foil. The other is an organically coated tank where the coating is a film. Both the foil and the film are theoretically impermeable; however, the bond to the substrate and the integrity of the final surface have proven to be unsatisfactory in both applications.

Cryotanks are generally fabricated from composites of either graphite fiber reinforced fiberglass or a glass reinforced polymer matrix. These tanks have been lined with either the metal foils or organic films. Metal coatings have also been utilized but the coating process, usually some form of deposition, has resulted in a porous surface that does not satisfactorily bond to the substrate.

In the case of metal foils, application is suitable for cone, cylinder or flat surface geometry; however the surfaces that need to be covered are not limited to these configurations making foils an unsuitable approach. With organic coatings, as with foils, the adhesion between the liner and the tank has not been satisfactory when exposed to cryotank temperatures. Therefore, there is a need to develop a containment tank that is impermeable to liquids and gases in harsh cryogenic and chemically corrosive environments.

SUMMARY OF THE INVENTION

In view of the above needs, it is an object of this invention to provide a cryotank that is impermeable to molecular intrusion at fluctuating temperatures.

It is another object of this invention to provide a molecularly impermeable coating that can adhere to a surface and maintain integrity at cryogenic temperatures.

It is another object of this invention to provide a molecularly impermeable coating that can adhere to a surface of irregular configuration.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the article of manufacture of this invention may comprise a tank configuration of suitable material to withstand cryogenic conditions. The interior of the tank is lined with consecutive layers of organic coatings. The first layer is of minimum thickness to establish a continuous coating for bonding; the next layer is of suitable thickness to establish bonding reliability; the next layer is of suitable thickness to insure molecular impermeability; the next layer is of suitable thickness to guarantee integrity at cryogenic temperatures; the final layer is of suitable thickness to insure a smooth defect-free surface. In the preferred embodiment the coating is an epoxy. The first layer is from about 0.0001 to 0.001 in. thick; the second layer is also about 0.0001 to 0.001 in. thick. The third layer is about 0.001 to 0.010 in. thick and so is the forth layer. The final layer is from about 0.0001 to 0.001 in. thick.

The invention is an improvement over past line cryotanks since the integrity of the lining has a longer life under cryogenic conditions than prior art methods.

DETAILED DESCRIPTION OF THE PREFERRED EMBODIMENT

The invention relates generally to a leak-proof seal for structural composites in extremely harsh cryogenic and chemically corrosive environments. Such seals have particular applicability for sealing surfaces having complex geometry as may be encountered on hypervelocity transport vehicles.

The method of the invention comprises the application, successively, of layers of epoxy resin formulations. First, two very thin layers, from about 0.0001 to 0.001 in. thick, are applied. This is followed by two thicker layers, about 0.001 to 0.010 in. thick. A final layer, from about 0.0001 to 0.001 in. thick, is added for a smooth defect-free surface.

EXAMPLE

In the preferred embodiment, the thin and thick epoxy resin formulations are each comprised of an A-component and a B-component. The application of each layer is followed by a curing step. A thin A-component composition is shown is Table 1, with thin A-component properties given in Table 2. The ingredients and solvents of thin B-component are shown in Table 3. Thin B-component properties are given in Table 4.

TABLE 1

THIN A-COMPONENT COMPOSITION

| Ingredient | Percent by Wt (±0.010%) |
|---|---|
| Epon 1002 or 1002F[1] | 54.9 |
| Dye, Oil Red PD15344[2] | 0.20 |
| Isopropyl Alcohol (ASTM D770) | 1.30 |
| Xylene (ASTM D846) | 2.80 |
| Methyl Isobutyl Ketone (ASTM D1153) | 5.60 |
| Cyclohexanone, Tech. Grade | 2.60 |
| Methyl Ethyl Ketone (ASTM D740) | 8.20 |
| Normal Butyl Alcohol (ASTM D304) | 2.60 |
| 1-Methoxy-2-Propanol | Remainder |

[1]Shell Chemical Co., Polymer Division #1 Shell Plaza, Houston, Texas 77002
[2]Eaton Chemical Division, Western Eaton Solvents & Chemical Co., 13395 Huron Dr., Romulus, Michigan, 48174

TABLE 2

THIN A-COMPONENT PROPERTIES

| Property | Requirement | Method |
|---|---|---|
| Color | Red | Visual |
| Specific gravity at 25° C. | 1.03–1.05 | ASTM D1963 |
| Resin Wt/Epoxide Equivalent (gm/eq) | 600–730 | Dry 5–10 ml sample at 65° C.; D1652; crst. vio. indicator |
| Viscosity Seconds | 25–40 | ASTM D3794 Zahn-Cup No. 3 |
| Solids, percent | 54–56 | ASTM D1944 |

TABLE 2-continued

| THIN A-COMPONENT PROPERTIES | | |
|---|---|---|
| Property | Requirement | Method |
| Clarity | Clear | ASTM D2090 |

TABLE 3

| THIN B-COMPONENT COMPOSITION | |
|---|---|
| Ingredient | Percent by Wt (±0.05%) |
| Diethylenetriamine | 1.43 AEW = 34.4 to 37.0 g/eq<br>Sp Grav = 0.945–0.955 |
| Amido-Amine<br>(Epi-Cure 855) | 3.53 Celanese, #1 Riverfront Plaza<br>Louisville, KY 40202 |
| Epoxy Resin Solution<br>(Epon 1001 CX 75) | 3.25 Shell, #1 Shell Plaza<br>Houston, TX 77002 |
| Solvent Mixture | Remainder (See Below) |
| **Solvent** | **Weight percent (±0.8%)** |
| Toluene (ASTM D362) | 5.24 |
| 1-Methoxy-2-Propanol | 51.38 |
| Isobutyl Alcohol<br>(ASTM D1719) | 23.75 |
| Methyl Ethyl Ketone<br>(ASTM D740) | 7.85 |
| Methyl Isobutyl Ketone<br>(ASTM D1153) | 10.16 |
| Xylene (ASTM D846) | 1.62 |

TABLE 4

| THIN B-COMPONENT PROPERTIES | | |
|---|---|---|
| Property | Requirement | Method |
| Amine equivalent weight (gm/eq) | 1360–1608 | N cmpds in gm providing one titratable N. equiv. |
| Specific gravity | 0.883–0.907 | ASTM D1963 |
| Non-volatiles, wt % | 6.00–6.60 | ASTM D1644 |
| Appearance | yellow to amber clear liquid | Visual |

To prepare the thin B-component composition, the amido-amine and diethylenetriamine are mixed at room temperature until homogeneous. The epoxy resin solution (EPON 1001CX 75) is preheated to 75° C.±5°, then gradually added to the amido amine diethylenetriamine mixture. Constant stirring is provided during the addition to provide for a complete reaction, while the temperature is maintained at 52° C.±3°. Mixing is discontinued when the brown solution becomes clear, after which the reaction mixture is allowed to cool to 37° C.±3°. The solvent mixture (Table 4) is added slowly with constant stirring until the solution is homogeneous and meets non-volatile requirements.

To prepare the thin coating, 45 volume % (±0.5%) quantities of A-component and B-component compositions are combined and thoroughly mixed. Methyl isobutyl ketone is gently stirred into a mixture of A-component and B-component to reach the 100% volume. The thin coating is then filtered through a Resco fine filter and allowed to stand for 45 minutes before using.

After degreasing the surface to be coated with one of several conventional degreasing solvents such as Freon TA or acetone, the thin coating is applied to the interior of a cryotank made of fiberglass reinforced with graphite fiber or of a polymer matrix reinforced with glass fiber. Application can be made with a dry lint-free and oil-free cloth or with a Teflon applicator such as a paddle, scraper or roller. The thin layers are allowed to dry for 30 minutes after which they are cured at 230° F.±5° for 2 hours. The combined components must be used within 8 hours of mixing and should be stored, if necessary, in a closed container at room temperature.

A thick A-component is shown in Table 5 with thick A-component properties given in Table 6. The ingredient and solvents of thick B-component are shown in Table 7. Thick B-component properties are given in Table 8.

TABLE 5

| THICK A-COMPONENT COMPOSITION | |
|---|---|
| Ingredient | Percent by Weight |
| Dye, Oil Red, PD15344[1] | 0.1 ± 0.01 |
| Liquid Epoxy Resin<br>Shell Epon 828[2] | Remainder |

[1]Eaton Chemical Division, Western Eaton Solvents & Chemical Co., 13395 Huron Dr., Romulus, Michigan, 48174
[2]Shell Chemical Co., Polymer Division #1 Shell Plaza, Houston, Texas 77002

TABLE 6

| THIN A-COMPONENT PROPERTIES | | |
|---|---|---|
| Property | Requirements | Method |
| Weight per Epoxide Equivalent | 180–196 | ASTM D1652 |
| Refractive Index | 1.5660–1.5760 | ASTM D1218 |
| Color | Red | Visual |
| Specific Gravity at 25° C. | 1.15–1.18 | ASTM D1963 |
| Water, wt % | 0.25 max. | ASTM E203 |
| Viscosity at 25° C., CPS | 10,000–15,000 | ASTM D2393 |
| Workmanship | Free of visible bubbles and contaminants | Visual |

TABLE 7

| THICK B-COMPONENT COMPOSITION | |
|---|---|
| Ingredient | Percent by Weight |
| P-Nonylphenol[1] | 45 ± 0.5 |
| Versamid 125[2] | 45 ± 0.5 |
| Mix well, then add<br>1-(2-Aminoethyl)piperazine[3] | (Remainder) |

[1]Eastman P7956 or equal, CAS Reg. No. 104-40-5, Jan. 1979
[2]Magnolia Plastics, Inc., Chamblee, CA; or Henkel Corp., Resin Div., 4620 W 77th St., Minneapolis, MN 55435
[3]Eastman 10643 or equal, CAS Reg. No. 140-31-8

TABLE 8

| THICK B-COMPONENT PROPERTIES | | |
|---|---|---|
| Property | Requirement | Method |
| Amine equivalent weight, gm/eq | 190–210 | N. compounds in gm providing one titratable $N_2$ equivalent |
| Refractive Index | 1.5095–1.5195 | ASTM D1218 |

The thick A+B composition comprises a 50:50 mixture (±1%) of the two solutions. The combined mixture has a maximum work life of 12 minutes at 75° F.±10° and must, therefore, be quickly applied using a dry lint-free and oil-free cloth or with a Teflon applicator such as a paddle, scraper or roller. The applied thick layers are cured at 150° F. for about 90 minutes, or at 165° F. for 60 minutes, or at 205° F. for at least 45 minutes. It is not recommended that the article be subjected to a temperature of more than 215° F. until curing is completed.

I claim:

1. A cryogenic tank comprising:

a tank configuration of suitable material to withstand cryogenic conditions;

the interior of said tank configuration lined with consecutive layers of organic coatings, said layers comprising;

a first layer of minimum thickness, from about 0.0001 to 0.001 in. thick, to establish a continuous coating for bonding;

a layer subsequent to said first bonding layer of suitable thickness, from about 0.0001 to 0.001 in. thick, to establish bonding reliability;

a layer subsequent to said bonding reliability layer of suitable thickness, from about 0.001 to 0.010 in. thick, to insure molecular impermeability;

a layer subsequent to said molecular impermeability layer of suitable thickness, from about from 0.001 to 0.010 in. thick, to guarantee integrity at cryogenic temperatures;

a layer subsequent to said integrity layer of suitable thickness, from about 0.0001 to 0.001 in. thick, to insure a smooth defect-free surface.

2. The cryogenic tank of claim 1 wherein said organic coatings comprise epoxy resins.

3. The cryogenic tank of claim 2 wherein said first bonding layer comprises the epoxy mixture of Table 1 and Table 3, as follows:

TABLE 1

| THIN A-COMPONENT COMPOSITION | |
|---|---|
| Ingredient | Percent by Wt (+0.010%) |
| Epon 1002 or 1002F[1] | 54.9 |
| Dye, Oil Red PD15344[2] | 0.20 |
| Isopropyl Alcohol (ASTM D770) | 1.30 |
| Xylene (ASTM D846) | 2.80 |
| Methyl Isobutyl Ketone (ASTM D1153) | 5.60 |
| Cyclohexanone, Tech. Grade | 2.60 |
| Methyl Ethyl Ketone (ASTM D740) | 8.20 |
| Normal Butyl Alcohol (ASTM D304) | 2.60 |
| 1-Methoxy-2-Propanol | Remainder |

[1]Shell Chemical Co., Polymer Division #1 Shell Plaza, Houston, Texas 77002
[2]Eaton Chemical Division, Western Eaton Solvents & Chemical Co., 13395 Huron Dr., Romulus, Michigan, 48174

TABLE 3

| THIN B-COMPONENT COMPOSITION | |
|---|---|
| Ingredient | Percent by Wt (+0.05%) |
| Diethylenetriamine | 1.43 AEW = 34.4 to 37.0 g/eq<br>Sp Grav = 0.945-0.955 |
| Amido-Amine | 3.53 Celanese, #1 Riverfront Plaza |

TABLE 3-continued

| THIN B-COMPONENT COMPOSITION | |
|---|---|
| (Epi-Cure 855) | Louisville, KY 40202 |
| Epoxy Resin Solution | 3.25 Shell, #1 Shell Plaza |
| (Epon 1001 CX 75) | Houston, TX 77002 |
| Solvent Mixture | Remainder (See Below) |
| Solvent | Weight percent (+0.8%) |
| Toluene (ASTM D362) | 5.24 |
| 1-Methoxy-2-Propanol | 51.38 |
| Isobutyl Alcohol (ASTM D1719) | 23.75 |
| Methyl Ethyl Ketone (ASTM D740) | 7.85 |
| Methyl Isobutyl Ketone (ASTM D1153) | 10.16 |
| Xylene (ASTM D846) | 1.62 |

said bonding reliability layer comprises the epoxy mixture of Table 1 and Table 3, said molecular impermeability layer comprises the epoxy mixture of Table 5 and Table 7, as follows:

TABLE 5

| THICK A-COMPONENT COMPOSITION | |
|---|---|
| Ingredient | Percent by Weight |
| Dye, Oil Red, PD15344[1] | 0.1 ± 0.01 |
| Liquid Epoxy Resin Shell Epon 828[2] | Remainder |

[1]Eaton Chemical Division, Western Eaton Solvents & Chemical Co., 13395 Huron Dr., Romulus, Michigan, 48174
[2]Shell Chemical Co., Polymer Division #1 Shell Plaza, Houston, Texas 77002

TABLE 7

| THICK B-COMPONENT COMPOSITION | |
|---|---|
| Ingredient | Percent by Weight |
| P-Nonylphenol[1] | 45 ± 0.5 |
| Versamid 125[2] | 45 ± 0.5 |
| Mix well, then add 1-(2-Aminoethyl)piperazine[3] | (Remainder) |

[1]Eastman P7956 or equal, CAS Reg. No. 104-40-5, Jan. 1979
[2]Magnolia Plastics, Inc., Chamblee, CA; or Henkel Corp., Resin Div., 4620 W 77th St., Minneapolis, MN 55435
[3]Eastman 10643 or equal, CAS Reg. No. 140-31-8 said integrity layer comprises the epoxy mixture of Table 5 and Table 7, and said smooth defect-free layer comprises the epoxy mixture of Table 1 and Table 3.

* * * * *